United States Patent [19]

Ishikawa et al.

[11] Patent Number: 5,176,341
[45] Date of Patent: Jan. 5, 1993

[54] AIRSHIP YAW LINE TRACTOR

[75] Inventors: Katsuhisa Ishikawa, Tamano; Keiji Nakamura, Kurashiki; Takao Suzuki; Noriaki Kondo, both of Tamano, all of Japan

[73] Assignee: Mitsui Engineering & Shipbuilding Co., Ltd., Tokyo, Japan

[21] Appl. No.: 729,295

[22] Filed: Jul. 12, 1991

[30] Foreign Application Priority Data

Jul. 25, 1990 [JP] Japan .............................. 2-78190[U]
Jul. 25, 1990 [JP] Japan .............................. 2-78191[U]

[51] Int. Cl.$^5$ ............................................ B64F 1/12
[52] U.S. Cl. ................................. 244/116; 24/136 R
[58] Field of Search .................. 244/115, 116, 50;
114/249, 253; 294/82.27, 82.3, 82.31; 24/136 R, 136 B

[56] References Cited

U.S. PATENT DOCUMENTS

| 703,713 | 7/1902 | Smith et al. ...................... 294/82.27 |
| 994,089 | 5/1911 | Bengtson .......................... 24/136 R |
| 1,465,246 | 8/1923 | Lemm ................................. 244/116 |
| 1,834,220 | 12/1931 | Purnell ............................... 244/116 |
| 2,704,193 | 3/1955 | Alard ................................. 244/116 |
| 3,610,674 | 10/1971 | Janssen ............................. 294/82.3 |
| 4,093,293 | 6/1978 | Huggett ........................... 294/82.27 |
| 4,174,132 | 11/1978 | Crook, Jr. ........................ 294/82.3 |
| 4,707,891 | 11/1987 | Chidester ........................ 24/136 R |
| 4,826,229 | 5/1989 | Smith ............................... 294/82.3 |

*Primary Examiner*—Joseph F. Peters, Jr.
*Assistant Examiner*—Anne E. Bidwell
*Attorney, Agent, or Firm*—Armstrong, Westerman, Hattori, McLeland & Naugton

[57] ABSTRACT

An airship yaw line tractor comprising: a yaw line connector for holding and releasing the yaw line of the airship through remote control; a winch for winding and unwinding a cable connected to the yaw line connector; and a control unit for automatically controlling the tensile force of the cable extending from the winch to the yaw line connector and automatically releasing the yaw line held by the yaw line connector in an emergency.

3 Claims, 6 Drawing Sheets

Fig.3a
Fig.3b
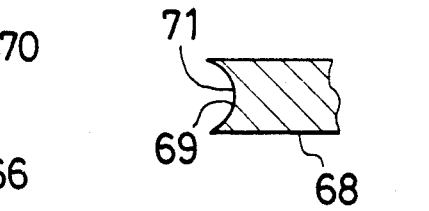
Fig.4
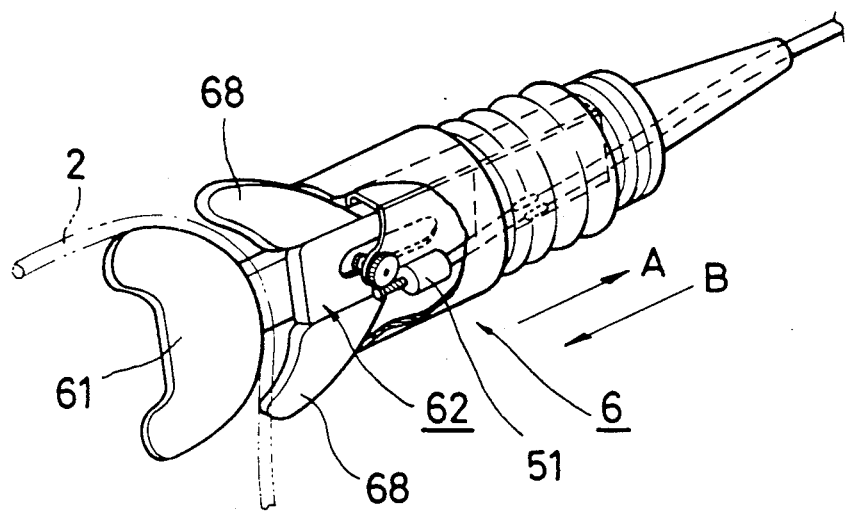
Fig.5
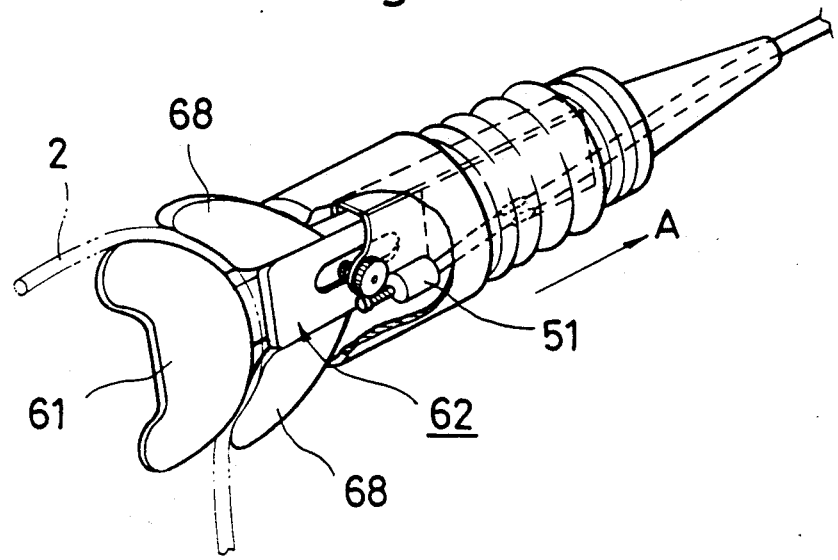

5,176,341

1

AIRSHIP YAW LINE TRACTOR

BACKGROUND OF THE INVENTION

This invention relates to an airship yaw line tractor, and more particularly to an airship yaw line tractor for towing an airship while holding a yaw line connected to the airship.

In general, taking off and landing of an airship has heretofore been performed with human wave tactics requiring many ground crew members. However, it has gradually been becoming difficult to secure many skilled ground crew members.

On the other hand, as an airship become large-sized, mechanization for the work of taking off and landing of an airship has become indispensable.

SUMMARY OF THE INVENTION

The present invention has been developed to meet the above-described demand and has as its object the provision of an airship yaw line tractor with which the work of taking off and landing of an airship can be performed safely and effectively by a limited number of ground crew members.

The airship yaw line tractor of the present invention, capable of achieving the above-described object comprises: a yaw line connector for holding and releasing the yaw line of an airship through remote control; a winch for winding and unwinding a cable connected to the yaw line connector; and a control unit for automatically controlling the tensile force of the cable extending from the winch to the yaw line connector and automatically releasing the yaw line held by the yaw line connector in an emergency.

The yaw line connector preferably includes: a cable holding portion; a rope keeping portion for pressing the yaw line on the cable holding portion; and a rope keeping portion moving means for making the rope keeping portion approach or withdraw from the cable holding portion.

Further, the rope keeping portion moving means preferably includes a reversible rotatable electric motor; a worm fixed to the rotary shaft of the electric motor; a worm wheel in meshing engagement with the worm; a pinion fixed to the worm wheel through a shaft; and a rack in meshing engagement with the pinion.

Further, the cable holding portion preferably has a cable holding surface opposed to the rope keeping portion, which surface projects toward the rope keeping portion in a circular arc shape.

As described above, the work of taking off and landing of an airship can be performed safely and effectively by a limited number of the ground crew members by use of the airship yaw line tractor comprising the yaw line connector for holding and releasing the yaw line of an airship through remote control, the winch for winding and unwinding the cable connected to the yaw line connector, and the control unit for automatically controlling the tensile force of the cable extending from the winch to the yaw line connector and automatically releasing the yaw line held by the yaw line connector in an emergency.

BRIEF DESCRIPTION OF THE DRAWINGS

FIG. 3a is a sectional view of the essential portions of the cable holding portion;

FIG. 3b is a sectional view of the essential portions of the rope keeping portion;

FIGS. 4 and 5 are explanatory views of the operation of the yaw line connector.

DESCRIPTION OF THE PREFERRED EMBODIMENTS

Figure 1:
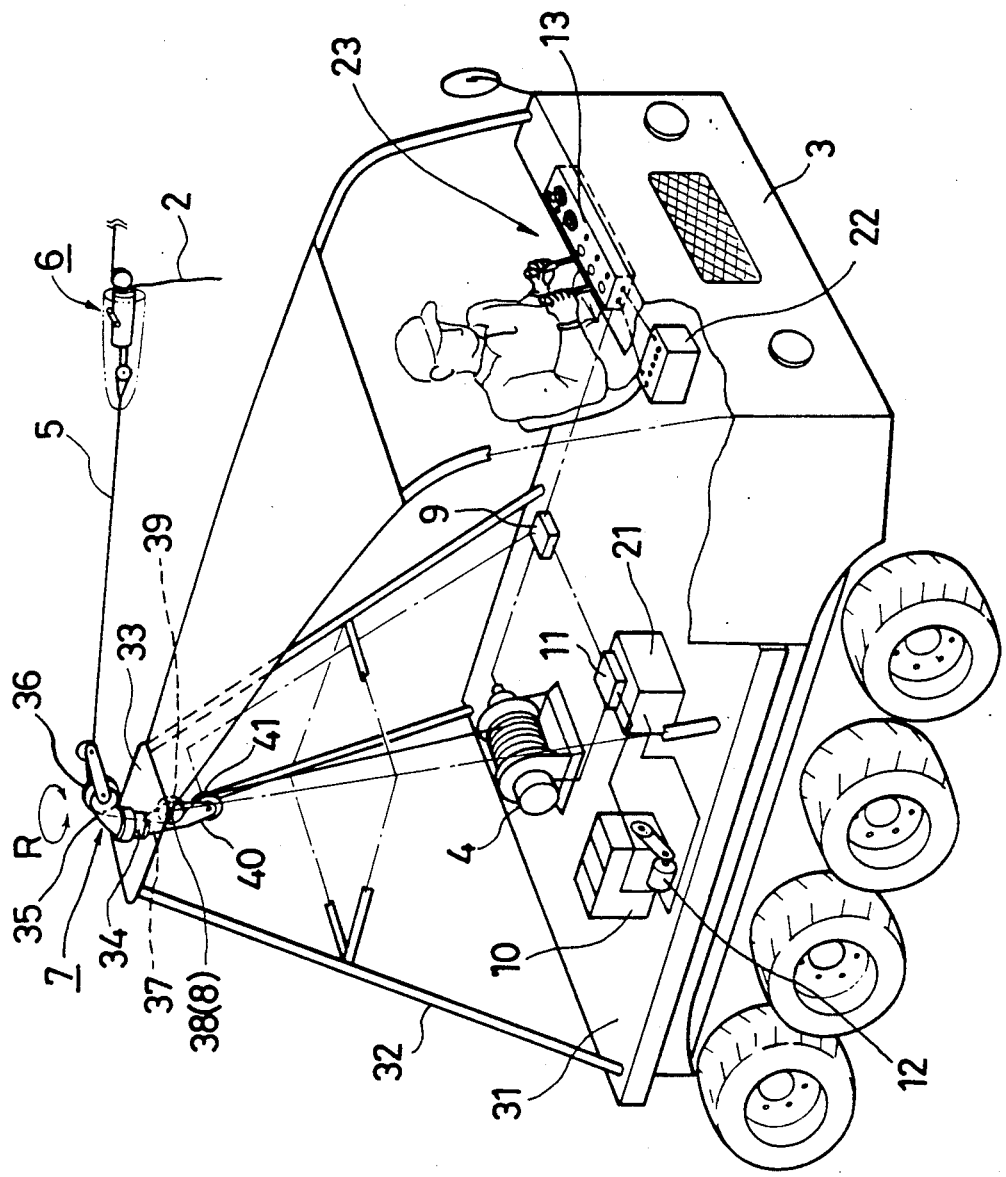
FIG. 1 is a perspective view of the airship yaw line tractor according to the present invention.
Figure 2:
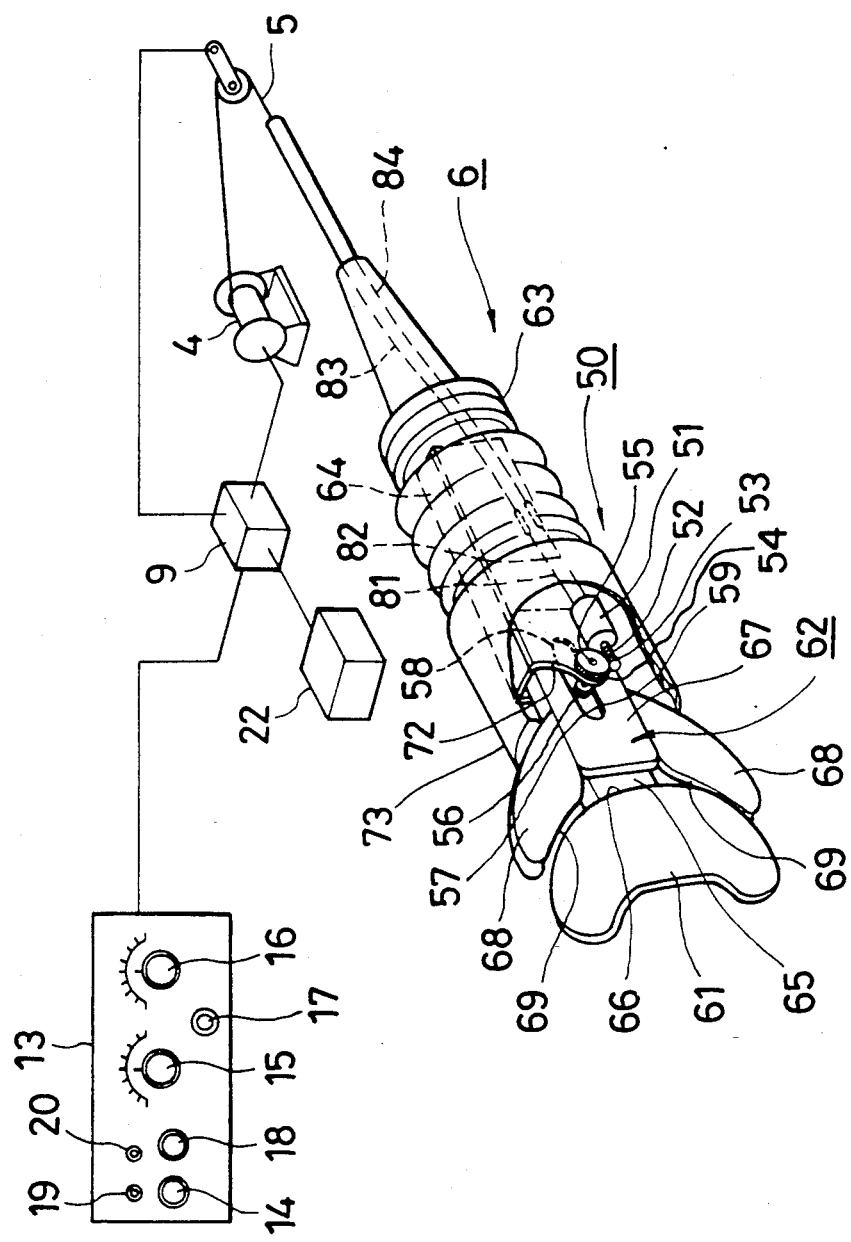
FIG. 2 is an explanatory view of the yaw line connector and a control system thereof.

In FIG. 1, designated at 3 is an eight wheel drive tractor which can run over a rough-surface ground. A control panel 13 is installed at a driver's seat 23 in the front of this tractor 3. As shown in FIG. 2, on this control panel 13, there are provided an emergency manual release switch 14, an auto-release tension control dial 15, an auto-tension control dial 16, an auto-tension change-over switch 17, a yaw line connector set switch 18, a cable winding switch 19 and a cable unwinding switch 20.

On the other hand, as shown in FIG. 1, a tower 32 is erected on a rear bed 31 of the tractor 3. Further, a guide 7 is provided on the top of the tower 32. This guide 7 is constituted by a tubular support member 34 fixed to a top plate 33 of the tower 2, a first bracket 35 mounted to the top portion of the support member 34 in a manner to be rotatable about the center line of the support member 34 through 360° in a direction indicated by an arrow R, a first pulley 36 rotatably mounted on the first bracket 35, a second bracket 37 fixed below the support member 34, a support shaft 38 rotatably mounted on the second bracket 37, a second pulley 39 rotatably mounted on the support shaft 38, a third bracket 40 fixed to the support shaft 38 and a third pulley 41 rotatably mounted on the third bracket 40. Further, secured to the support shaft 38 is a tension gauge 8 for detecting a tensile force of rotation of the third bracket 40, i.e. a tensile force of a complex cable (hereinafter referred to as a "cable") 5.

Further, provided on the rear bed 31 are: a winch 4 for winding and unwinding the cable 5; a control unit 9 for mainly automatically controlling the tensile force of the cable extending from the winch 4 to a yaw line connector 6 and automatically releasing a yaw line 2 held by the yaw line connector 6 in an emergency; an internal combustion engine 10 for traveling and driving a hydraulic pump; a control valve 11 for controlling a working oil flow rate for driving the winch; an oil tank unit 21 for storing the working oil; a hydraulic pump 12 for pumping up the working oil stored in the oil tank unit 21; and a battery 22 for mainly driving an electric motor 51 in the yaw line connector 6 and serving as a power source for the control panel 13.

Further, the cable 5 is connected to the yaw line connector 6. This cable 5 passes through the first pulley 36 and the support member 34 in the guide 7, is passed around the second pulley 39 and the third pulley 41 in an S shape, and thereafter, wound up by the winch 4.

As shown in FIG. 2, in the yaw line connector 6, the cable, not shown, is held by a cable holding portion 61 and a rope keeping portion 62. The cable holding portion 61 is fixed to a guide portion 64 having a cross-section of a recessed shape, which is fixed to a grip 63 through a frame 65. The frame 65 is adapted to connect the rear surface of the cable holding portion 61 to the rear surface of the guide portion 64. Further, in the cable holding portion 61, a cable holding surface 66 opposed to the rope keeping portion 62 projects in a circularly arcuate shape toward the rope keeping portion 62, so that the jump-up phenomenon of a cable end portion caused when the cable 5 slides through the cable holding surface 66 is prevented. On the other hand, the rope keeping portion 62 is constituted by a strip-like slidable portion 67 coupled into the guide portion 64 of the cable holding portion and a pair of ear-shaped rope keeping pieces 68, 68 fixed to the opposite sides of the forward end portion of this slidable portion 67. As shown in FIG. 3a, provided on the cable holding surface 66 of the cable holding portion 61 is a circularly arcuate groove 70. Further, as shown in FIG. 3b, provided on the cable holding structure 69 at the front surface of the rope keeping piece 68 is a circularly arcuate groove 71. The groove surfaces of these two grooves 70 and 71 are knurled, so that the frictional force can be increased.

Further, provided at the side of the slidable portion 67 of the rope keeping portion is a rope keeping portion moving means 50. This rope keeping portion moving means 50 is constituted by reversible electric motor 51, a worm 53, FIG. 2, fixed to a rotary shaft 52 of the electric motor 51, a worm wheel 54 being in meshing engagement with the worm 53, a pinion 56 fixed to a shaft 55 of the worm wheel 54 and a rack 57 being in meshing engagement with the pinion 56. This rack 57 is provided on a lower end face of a slot 58 formed in the slidable portion 67 of the rope keeping portion. Further, the electric motor 51 and the shaft 55 of the worm wheel are secured to a lid 72 covering an opening portion of the guide portion 64. Further, lead wires 81, 82 of the electric motor 51 are connected to electric wires 83, 84 assembled into the cable 5. Further, a portion between the rope keeping piece 68 and the grip 63 of the yaw line connector 6 is covered by a cover 73 made of rubber.

As shown in FIG. 4, in the yaw line connector 6, the rope keeping portion 62 is normally retracted in a direction indicated by an arrow A, and an open space is formed between the cable holding portion 61 and the rope keeping portion 62. Accordingly, to hold the yaw line, the yaw line 2 is engaged with the cable holding portion 61, and the yaw line connector set switch 18 is pressed. Then, the electric motor 51 rotates forwardly, whereby the rope keeping portion 62 advances in a direction indicated by an arrow B. Then, as shown in FIG. 5, the rope keeping pieces 68, 68 of the rope keeping portion 62 press the yaw line 2 against the cable holding portion 61. Then, the yaw line 2 is held by the cable holding portion 61 and the rope keeping portion 62. Conversely to release the yaw line 2, the emergency manual release switch 14 is pressed. Then, the electric motor 51 rotates reversely, whereby the rope keeping portion 62 is retracted in a direction indicated by an arrow A. Then, as shown in FIG. 4, a gap is formed between the cable holding portion 61 and the rope keeping pieces 68, 68 of the rope keeping portion, whereby the yaw line 2 is released from the yaw line connector 6.

The work of trailing the airship will hereunder be described with reference to FIGS. 6 through 10.

Figure 6:
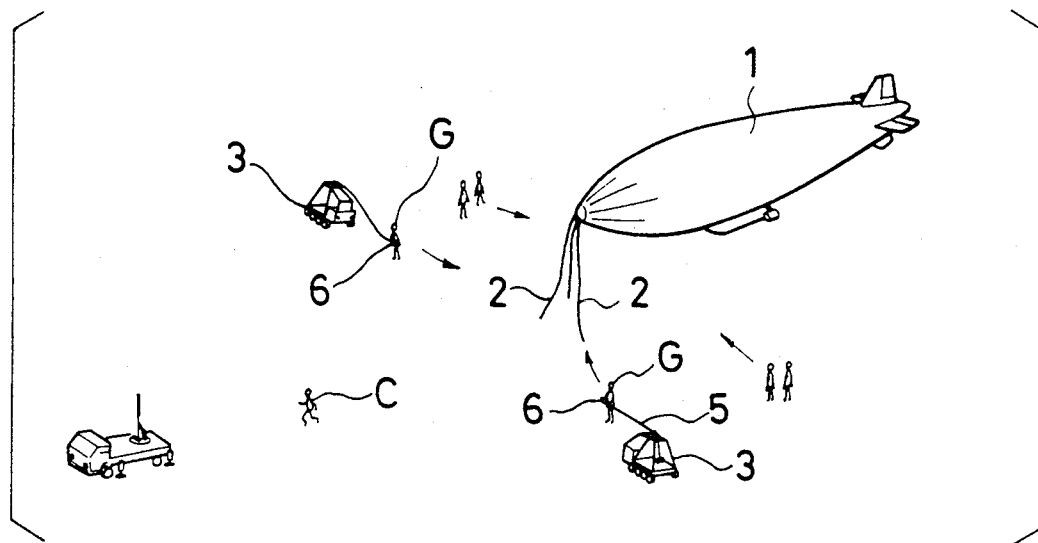
FIGS. 6 through 10 are explanatory views of the operation of the airship yaw line tractor according to the present invention.

As shown in FIG. 6, two tractors 3 are prepared to tow the airship 1 which has landed. These tractors 3, 3 are previously set at an auto-release value by the auto-release tension adjusting dial 15 with the weather conditions and the like being allowed therefor, and the auto-tension adjusting dial 16 is operated to set an auto-tension value. Further, the emergency manual release switch 14 is pressed to set the yaw line connector 6 at an open state as shown in FIG. 4.

Subsequently, by a signal from a crew chief C, the yaw line work is started. Namely, drivers, not shown, of the tractor 3 press the unwinding switches 19, and simultaneously, each of ground members G runs toward the yaw line 2 of the airship 1, holding the yaw line connector 6.

Figure 7:
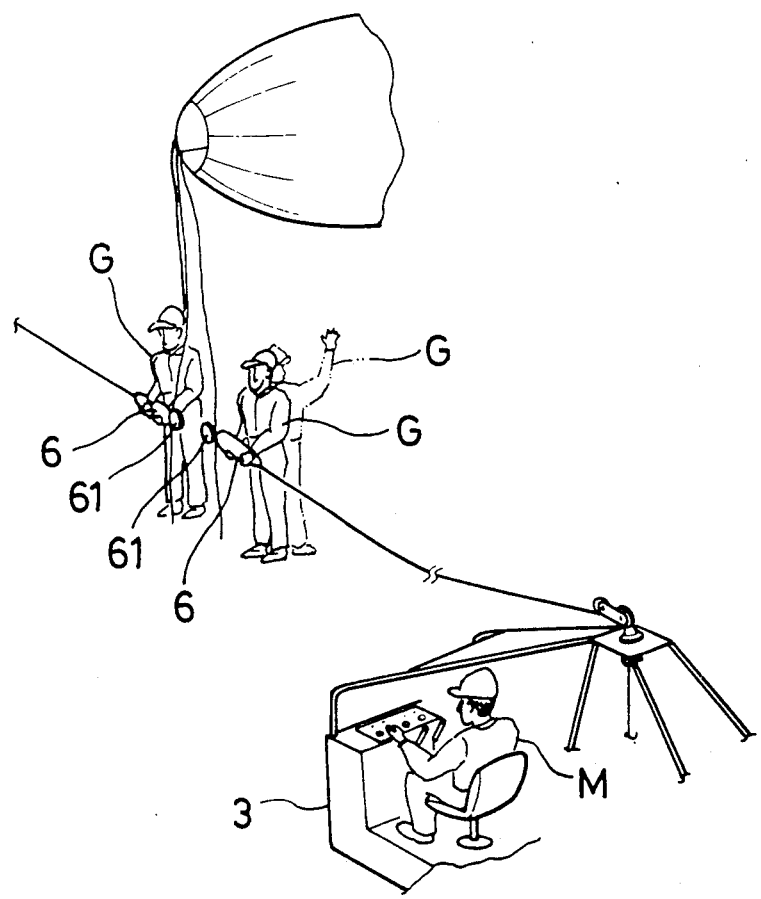

Next, as shown in FIG. 7, when each of the ground crew members G engages the cable 5 with the cable holding portion 61, then gives a signal to a driver M of the tractor 3.

Subsequently, when the driver M presses the yaw line connector set switch 18, the yaw line 2 is held by the yaw line connector 6 as shown in FIG. 5.

Figure 8:
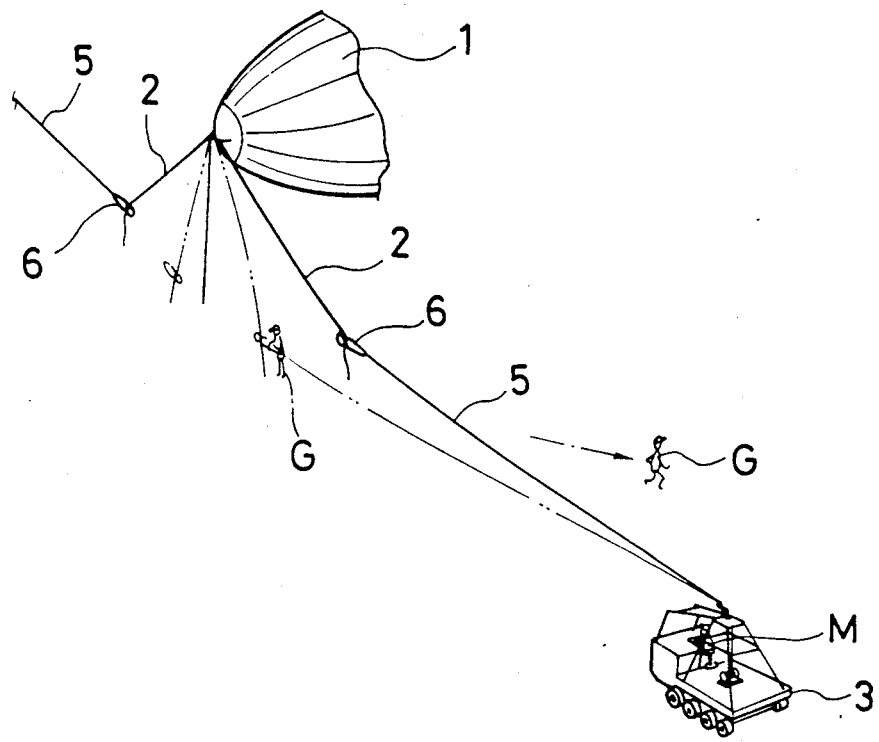

Next, when it is confirmed that the yaw line 2 is held by the yaw line connector 6, the ground crew members G quickly return to safe places as shown in FIG. 8.

Subsequently, the safety of the ground crew members G is confirmed, the drivers M of the tractors 3 press the auto-tension change-over switches 17. At this time, upon receiving a signal from the crew chief C, the drivers M of the tractors on the both sides press the auto-tension change-over switches 17 simultaneously.

Figure 9:
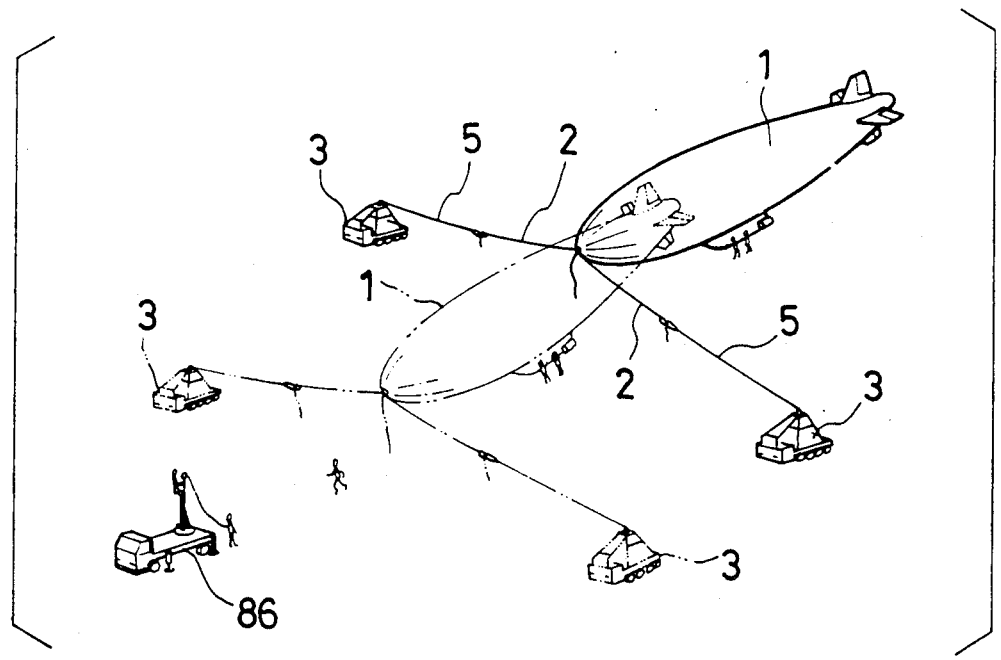

Next, as shown in FIG. 9, the right and left tractors 3, 3 advance in conformity with the movement of the airship 1 with care taken not to apply an undue force to the airship.

Figure 10:
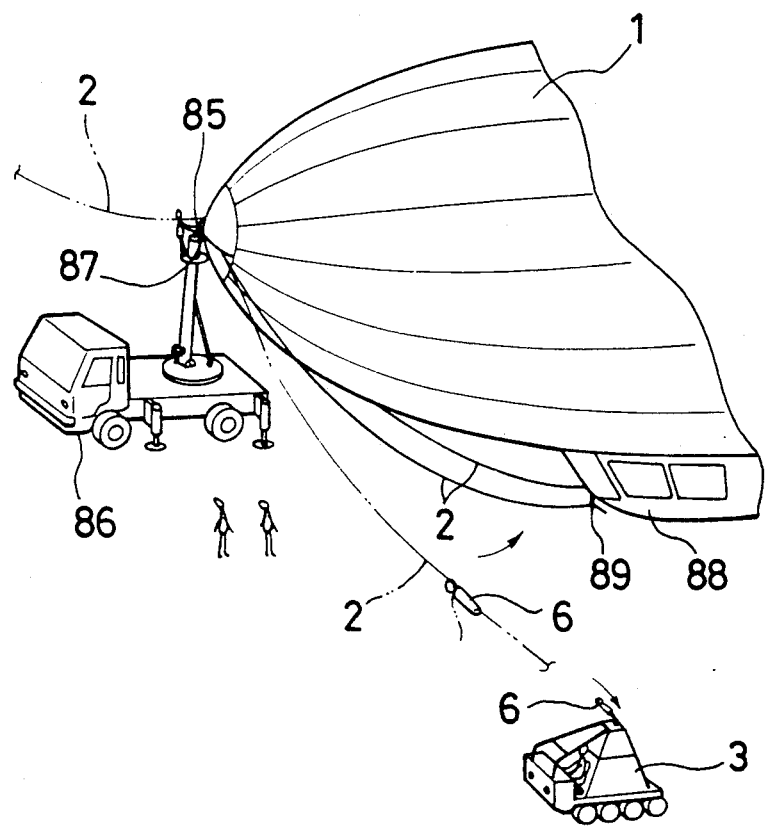

Subsequently, as shown in FIG. 10, a connector 85 at the forward end of the airship 1 is connected to a connector 87 at the top of a mast of a mast car 86, and thereafter, when the drivers M of the tractors 3 press the emergency manual release switches 14, the yaw line connectors 6 are brought into open states, whereby the yaw lines 2 are released from the yaw line connectors 6. These yaw lines 2 are tied up to a railing 89 of a gondola 88 of the airship so as not to be obstructive.

Now, when the tensile force of the cable 5 is deviated from a preset tension value during the movement of the airship 1, the forward or reverse rotation of the winch 4 is controlled by the control unit 9 which has received a fluctuation signal from the tension gauge 8, whereby the tensile force of the cable 5 is automatically controlled. If a tensile force exceeding the preset auto-release tension value instantaneously acts on the cable 5, the rope keeping portion 62 is automatically retracted as shown in FIG. 4, whereby the yaw line 2 is automatically released.

What is claimed is:

1. An airship yaw line tractor comprising:
   a yaw line connector for holding and releasing the yaw line of the airship through remote control;
   a winch for winding and unwinding a cable connected to the yaw line connector; and
   a control unit for automatically controlling the tensile force of the cable extending from the winch to the yaw line connector and automatically releasing the yaw line held by the yaw line connector in an emergency, said yaw line connector including:
   a cable holding portion, a rope keeping portion for pressing the yaw line on the cable holding portion; and a rope keeping portion moving means for making the rope keeping portion approach or withdraw from the cable holding portion, said rope keeping portion including: a reversible electric motor; a worm fixed to a rotary shaft of the electric motor; a worm wheel in meshing engagement with the worm; a pinion fixed to the worm wheel through a shaft; and a rack in meshing engagement with the pinion.

2. A yaw line connector for holding and releasing the yaw line of an airship through remote control;
- a winch for winding and unwinding a cable connected to said yaw line connector; and
- a control unit for automatically controlling the tensile force of said cable extending from said winch to said yaw line connector and automatically releasing said yaw line held by said yaw line connector in an emergency, said yaw line connector including:
- a cable holding portion, a rope keeping portion for pressing said yaw line on said cable holding portion; and a rope keeping portion moving means for making said rope keeping portion approach or withdraw from the cable holding portion, said rope keeping portion including: a reversible electric motor; a worm fixed to a rotary shaft of said electric motor; a worm wheel in meshing engagement with said worm; a pinion fixed to said worm wheel through a shaft; and a rack in meshing engagement with said pinion.

3. A yaw line connector according to claim 2, wherein said cable holding portion has a cable holding surface opposed to said rope keeping portion, which surface projects toward said rope keeping portion in a circular arc shape.

* * * * *